United States Patent [19]

Seubert et al.

[11] Patent Number: 4,674,407

[45] Date of Patent: Jun. 23, 1987

[54] LUG ASSEMBLY FOR BOMB TO BOMBRACK ATTACHMENT

[75] Inventors: John G. Seubert; Kevin G. Beasly, both of Bloomington; Stanley J. Herold, Switz City; John E. Laswell, Bloomfield, all of Ind.

[73] Assignee: The United States of America as represented by the Secretary of the Navy, Washington, D.C.

[21] Appl. No.: 870,219

[22] Filed: Jun. 2, 1986

[51] Int. Cl.⁴ ............................................. F42B 25/20
[52] U.S. Cl. .................................... 102/293; 102/382
[58] Field of Search ...................... 102/293, 382, 395; 89/1.54, 1.58, 1.59, 1.51

[56] References Cited

U.S. PATENT DOCUMENTS

| | | | |
|---|---|---|---|
| 2,491,400 | 12/1949 | Thumim | 89/1.5 |
| 2,852,981 | 9/1958 | Caya | 89/1.58 |
| 2,949,822 | 6/1958 | Musser | 89/1.5 |
| 2,984,180 | 5/1961 | Lyon | 102/382 |
| 3,044,162 | 7/1962 | Lyon | 102/382 |
| 3,224,334 | 12/1965 | Curtis et al. | 102/382 |
| 3,883,097 | 5/1975 | Billot | 244/137 R |
| 4,257,639 | 3/1981 | Stock | 294/83 R |
| 4,352,314 | 10/1982 | Engel et al. | 89/1.5 F |
| 4,620,484 | 11/1986 | Livne | 102/395 |

Primary Examiner—Charles T. Jordan
Attorney, Agent, or Firm—Robert F. Beers; Harvey A. David

[57] ABSTRACT

A bomb to bombrack attachment lug assembly engages in a keyhole slot of a practice bomb casing and includes a metal lug element and a plastic locator element that centers and releasably locks the assembly in the keyhole slot. The lug element has an eye portion, a stem and arms extending laterally from the stem, while the locator element includes a cylindrical body snapped onto the stem and arms and has laterally extending ears having retaining bosses that engage the slot.

3 Claims, 3 Drawing Figures

LUG ASSEMBLY FOR BOMB TO BOMBRACK ATTACHMENT

BACKGROUND OF THE INVENTION

This invention relates generally to the field of attachment of bombs to bombracks, and more particularly to a novel attachment lug assembly that can be readily added to or removed from a bomb, notably a practice bomb, to adapt the bomb to use with bombracks having differing attachment requirements.

Aircraft of the different branches of the military, or aircraft of different design within a branch, have bombracks some of which require an eye or lug extending from the sides of the bombs for attachment while others do not, although the bombs themselves may otherwise be the same. Some practice bombs have been provided with permanent lugs making them unsuitable for use in other racks. It would, especially in the case of practice bombs, be desirable to be able to use the same bomb for a variety of aircraft bombrack configurations, thereby effecting certain economies in manufacture and distribution.

SUMMARY OF THE INVENTION

With the foregoing in mind, it is a principal object of this invention to provide a practice bomb attachment lug assembly that can be readily attached to or removed from the side of a practice, or other, bomb that has a slot formed in the casing thereof for that process, thereby rendering the bomb adaptable to a variety of types of bombracks.

Another object of this invention is to provide an attachment lug assembly comprising a metal lug having an eye portion for engagement by a hook or pintle, a stem depending from the eye portion, laterally extending arms projecting from the stem, and a plastic locator element mounted on the lug stem and cooperable with the opening or slot in the bomb casing to center the lug and to lock it in the correct position for retention, and in the correct orientation for loading into a bomb rack.

As still another object, the invention aims to provide a bomb suspending attachment lug assembly of the foregoing character that is inexpensive to manufacture, easy to assemble with a bomb, and is reliable in operation.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
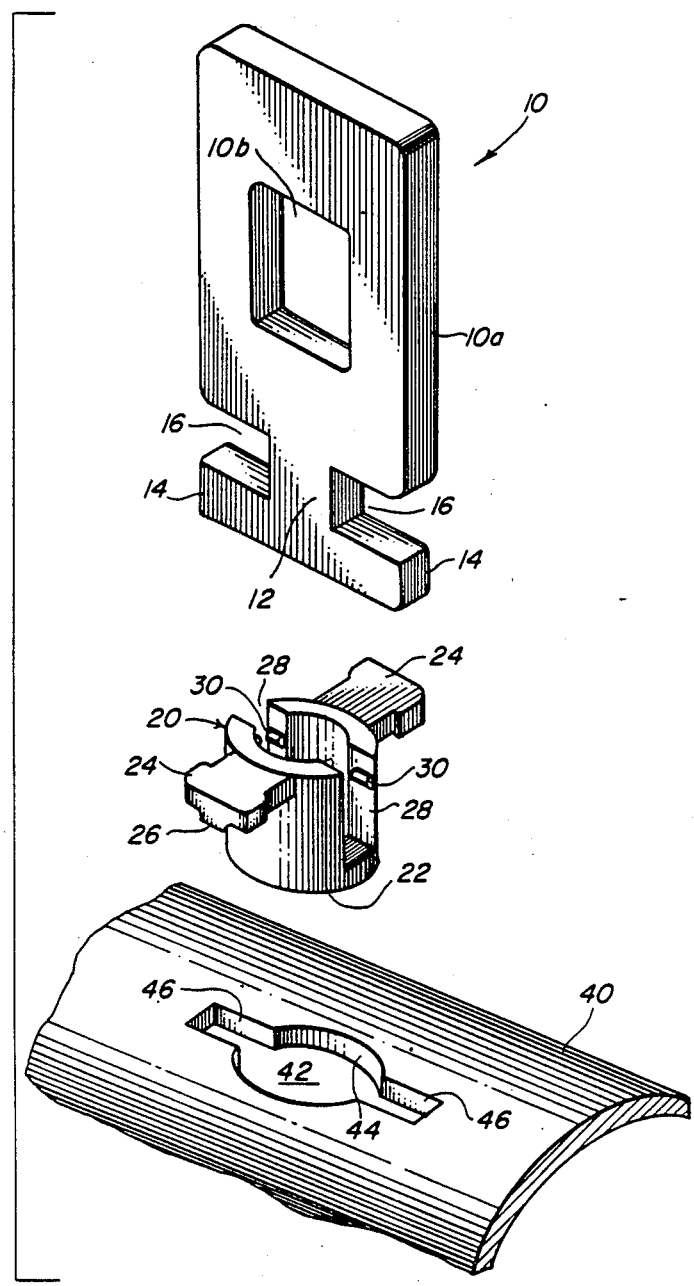
FIG. 1 is a perspective, exploded view illustrating components of a bomb to bomb-rack attachment lug assembly embodying the invention, and shown with a fragment of bomb casing.

In the exemplary form of the invention illustrated in the drawings, and with reference now to FIG. 1, a generally planar lug element 10 is conveniently formed by punching or machining from metal sheet or plate and comprises an eye portion 10a defining an opening 10b adapted to receive a hook or pintle, a stem 12 and arms 14 extending laterally from opposite sides of the stem. The eye portion 10a, the stem 12 and the arms 14 all lie in a common plane and are formed from metal of sufficient thickness and strength to be rigid in use. The arms 14 are spaced by the stem 12 from the eye portion 10a so as to define notches 16 therebetween.

The lug element 10 is adapted to be assembled with a locator element 20 which is formed, preferably by molding, of a tough, resilient plastic material such as nylon, or the like. The element 20 comprises a generally cylindrical, cup-shaped, hollow body 22 having an inside diameter slightly less than the width of the stem 12 of the lug element, and an outside diameter that is less than the end to end span of the arms 14 of the lug element.

Extending outwardly from the circumference of the upper edge region of the body 22 are a pair of ears 24 that are enlarged at their outer ends and provided with downwardly directed ribs or bosses 26. The body 22 has defined in the cylindrical wall thereof two diametrically opposed vertical slots 28, the widths of which are such as to be able to nicely receive the thickness of the lug element 10. These slots are oriented so as to be aligned at right angles, or othoganally, relative to the ears 24. Disposed on the inner surfaces of the slots are pairs of projections or nibs 30.

Figure 2:
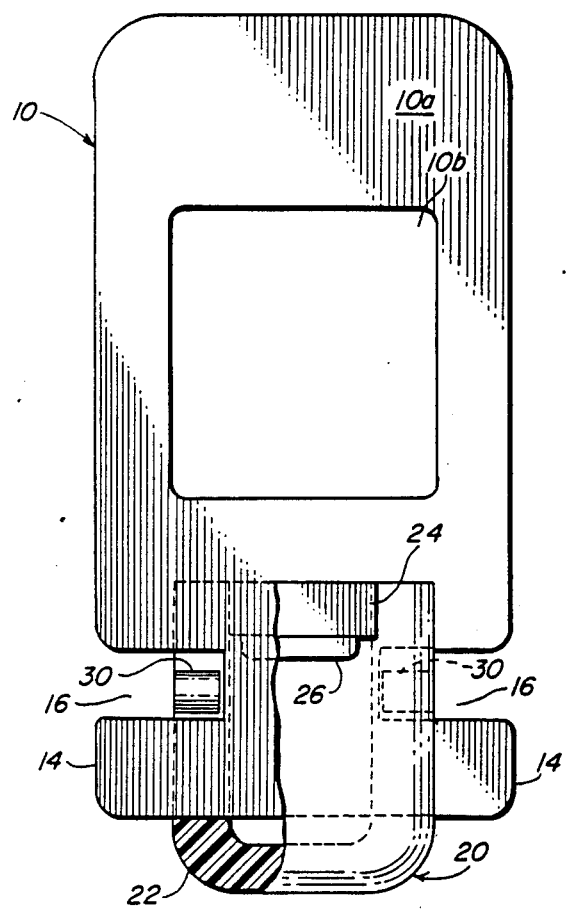
FIG. 2 is a view, partly in front elevation and partly in section of a lug assembly according to the invention.
Figure 3:
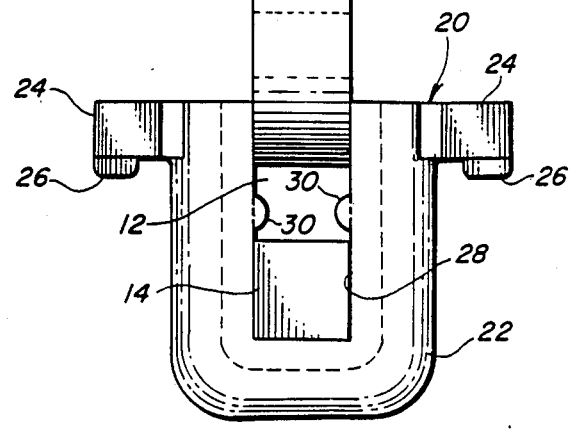
FIG. 3 is a side elevational view of the assembly.

The lug element 10 is readily assembled with the locator element 20 by insertion into the slots 28 to form a lug assembly, as shown in FIGS. 2 and 3. The elements are releasably retained in their assembled condition by the nibs 30 which are resiliently spread by arms 14 during assembly until they ride over and engage in notches 16 above the upper edges of the arms. The nibs also are adapted to engage the side edges of the lug stem so that the stem is centered relative to the central axis of the locator body.

With reference again to FIG. 1, the lug assembly is adapted to be mounted on a bomb casing, a portion of which is shown at 40, having a keyhole opening or slot 42 formed therein. The keyhole slot has a circular center portion having a diameter slightly greater than the outside diameter of the body 22 of locator 20, and diametric or antipodal rectangular portions 46, slightly larger than the arms 14 of lug element 10. In use, the body 22 of the locator 20 of the assembly is inserted into the circular portion of keyhole 42 with the arms 14 oriented so as to enter the rectangular slot portions 46 until the ribs 26 of ears 24 engage the surface of the bomb casing 40. The lug is pressed inwardly so as to resiliently flex the ears 24, and rotated to bring the projecting ends of the arms 14 under the casing 40 until the ribs or bosses 26 of the ears 24 snap into registration with the slot portions 46. In that position, the eye portion 10a of lug element 10 is transverse to the longitudinal axis of the bomb casing 40 and the ears 24 overlie the respective rectangular slot portions. The lug assembly is thereby locked in position for cooperation with a bombrack hook or pintle for suspending the bomb. Removal of the lug assembly can readily be accomplished by prising up the ears 24 sufficiently to allow the assembly to be rotated until the arms 14 are aligned with slot portions 46, at which point the assembly is readily withdrawn.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A lug assembly engageable in a keyhole slot in a bomb casing for use in bomb to bombrack attachment, said keyhole slot having a circular central portion and rectangular portions extending antipodally therefrom and parallel to the axis of the bomb, said lug assembly comprising:

a generally planar lug element comprising an eye portion, a stem projecting from said eye portion, and a pair of arms extending laterally from opposite sides of said stem, said arms having a predetermined span and defining notches between said arms and said eye portion;

a locator element formed of a tough, resilient plastic material and comprising a hollow, cylindrical cup-shaped body having an outside diameter that is less than said span of said arms and slidably receivable in said central portion of said keyhole slot, a pair of ears extending laterally from the upper rim portion of said body, said ears having portions wider than said rectangular portions of said keyhole slot, and said body having a pair of vertical slots snugly receiving the lower portions of said lug element with said arms extending from said body in directions generally at right angles to the extent of said ears;

whereby when said body and arms of said assembly are inserted into said keyhold slot and rotated a quarter turn, said arms engage the inner surface of said casing to prevent withdrawal of said assembly and said ears engage the outer surface of said casing and overlie said rectangular portions of said slot with said bosses engaged in said rectangular portions to resist additional rotation of said assembly in either direction.

2. A lug assembly as defined in claim 1, and wherein said body of said locator element comprises a plurality of nibs extending into said vertical slots and adapted to engage in said notches of said lug element so as to resist separation of said lug element from said locator element.

3. A lug assembly as defined in claim 2, and wherein said lug element is formed from methal sheet or plate.

* * * * *